United States Patent [19]

Cornelius et al.

[11] 4,407,510
[45] Oct. 4, 1983

[54] ADJUSTABLE PACKING GLAND ASSEMBLY FOR MOVABLE BLADE DAMPER

[75] Inventors: Jack M. Cornelius; Egon V. Braunagel, both of Birmingham, Ala.

[73] Assignee: Flo-Tech Dampers, Inc., Birmingham, Ala.

[21] Appl. No.: 320,950

[22] Filed: Nov. 13, 1981

[51] Int. Cl.³ .............................................. F16J 15/00
[52] U.S. Cl. ...................................... 277/12; 277/37; 277/47; 277/105
[58] Field of Search ................. 277/12, 102, 105, 106, 277/37, 45, 47, 137; 110/163; 236/1 G; 126/285 R, 292; 98/110, 121 A, 121 R

[56] References Cited

U.S. PATENT DOCUMENTS

| | | | |
|---|---|---|---|
| 315,350 | 4/1885 | Shook | 277/105 |
| 2,069,443 | 2/1937 | Hill | 277/30 |
| 3,172,671 | 3/1965 | Downs | 277/137 |
| 3,281,113 | 10/1966 | Ahern | 98/121 R X |
| 4,194,746 | 3/1980 | Stevens | 277/105 X |

Primary Examiner—Stuart S. Levy
Assistant Examiner—Lloyd D. Doigan
Attorney, Agent, or Firm—Hume, Clement, Brinks, Willian & Olds

[57] ABSTRACT

A packing gland assembly for a movable blade damper comprises a packing gland sleeve and a packing gland cap. The cap serves to confine a packing material between the packing gland sleeve and a blade shaft which passes through a damper frame and supports a damper blade. In addition, the packing gland sleeve defines a circular recess which receives a pressure seal between the packing gland sleeve and a frame member. The packing gland assembly is held in place against the frame member by means of two threaded fasteners such that a range of lateral adjustment is provided. In this way, the packing gland assembly is positively and sealingly mounted in place on the frame member, yet is free to follow the blade shaft as necessary to maintain concentricity between the packing gland sleeve and the shaft during adjustment.

12 Claims, 3 Drawing Figures

ADJUSTABLE PACKING GLAND ASSEMBLY FOR MOVABLE BLADE DAMPER

BACKGROUND OF THE INVENTION

This invention relates to an improved packing gland assembly for providing a gas-tight seal at the point where a damper blade shaft passes through the damper frame of a movable blade damper.

One type of damper known to the art utilizes a peripheral frame which surrounds several movable damper blades. Each of the blades is mounted on a respective shaft which passes through the damper frame, and the shafts are rotated in coordination so as selectively to close and open the damper.

In the past, packing glands have been used around the damper blade shafts to provide a gas-tight seal at the point where the blade shafts pass through the damper frame. One commonly used approach of the prior art is to weld individual packing glands in place on the damper frame to prevent gas leakage such as flue gas leakage around the damper blade shaft.

Though this prior art approach can, if properly implemented, provide a suitable seal around the damper blade shaft, it provides a number of important disadvantages. Once the packing gland has been welded into place on the damper frame, no lateral adjustment can be made of the blade shaft without affecting the concentricity between the blade shaft and the packing gland. Excessive eccentricity between the blade shaft and the packing gland can cause unacceptably high rates of gas leakage through the packing gland. Thus, prior art packing glands which are welded in place to the damper frame can restrict the amount of lateral adjustment that can be made to the blade shafts without physically removing the packing gland. If the blade shafts are not adjusted properly, openings between sealing surfaces on the blades caused by the inability to adjust the blade clearances as desired can also allow unacceptably high rates of gas leakage through the damper when in the closed position.

Furthermore, when packing glands are welded in place to damper frames, replacement of the packing material within the packing gland can be a difficult operation since the gland is open at one end only. In addition, surfaces of the blade shaft within the packing gland are relatively inaccessible due to the fixed location of the gland. Any shaft surface defects in the region of the gland may promote gas leakage through the gland or increase torque requirements to rotate the shaft. Such surface defects can be difficult to detect or correct because they are concealed by the gland. Moreover, packing glands which are welded in place are difficult or impossible to replace due to the need to cut or burn them out.

SUMMARY OF THE INVENTION

The present invention is directed to an improved packing gland assembly for a movable blade damper which to a large extent overcomes the aforementioned disadvantages of the prior art.

According to this invention, an improved packing gland assembly is provided which is held in place on the damper frame by means of fasteners such as threaded fasteners. The packing gland assembly of this invention is mounted to the frame in a removable and adjustable manner such that, within a predetermined range of adjustability, the packing gland assembly is free to follow the shaft as necessary in order to preserve the desired degree of concentricity between the packing gland and the shaft.

In the preferred embodiment described below, the packing gland assembly is held in place by two threaded fasteners such as bolts which pass through elongated slots in the packing gland assembly. Whenever it is desirable to adjust the position of the packing gland assembly, the fasteners are loosened and the gland is allowed to follow the shaft as the shaft position is adjusted. Once the shaft position has been properly adjusted, these threaded fasteners are then tightened to lock the packing gland assembly in position and to provide an excellent seal preventing the escape of gases out of the damper around the shaft.

The improved packing gland assembly of this invention provides a number of important advantages. It maintains excellent concentricity between the packing gland assembly and the blade shaft to ensure that a positive seal is created to prevent the leakage of gas out of the damper around the shaft. Since the packing gland assembly is held in place by means of fasteners rather than by means of welds, the fasteners can be loosened as necessary to allow the packing gland assembly to move laterally with the blade shaft when the position of the blade shaft is adjusted. The packing gland assembly of this invention provides two seals: one between the packing gland assembly and the damper frame and a second between the blade shaft and the packing gland assembly. Together, these two seals cooperate to provide an effective seal against the escape of gases out of the damper. Since the packing gland assembly can readily be removed when necessary for service, the packing gland assembly of this invention is readily replaced when necessary. Furthermore, since both ends of the packing gland assembly are accessible, the packing material can readily be removed and replaced when necessary.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
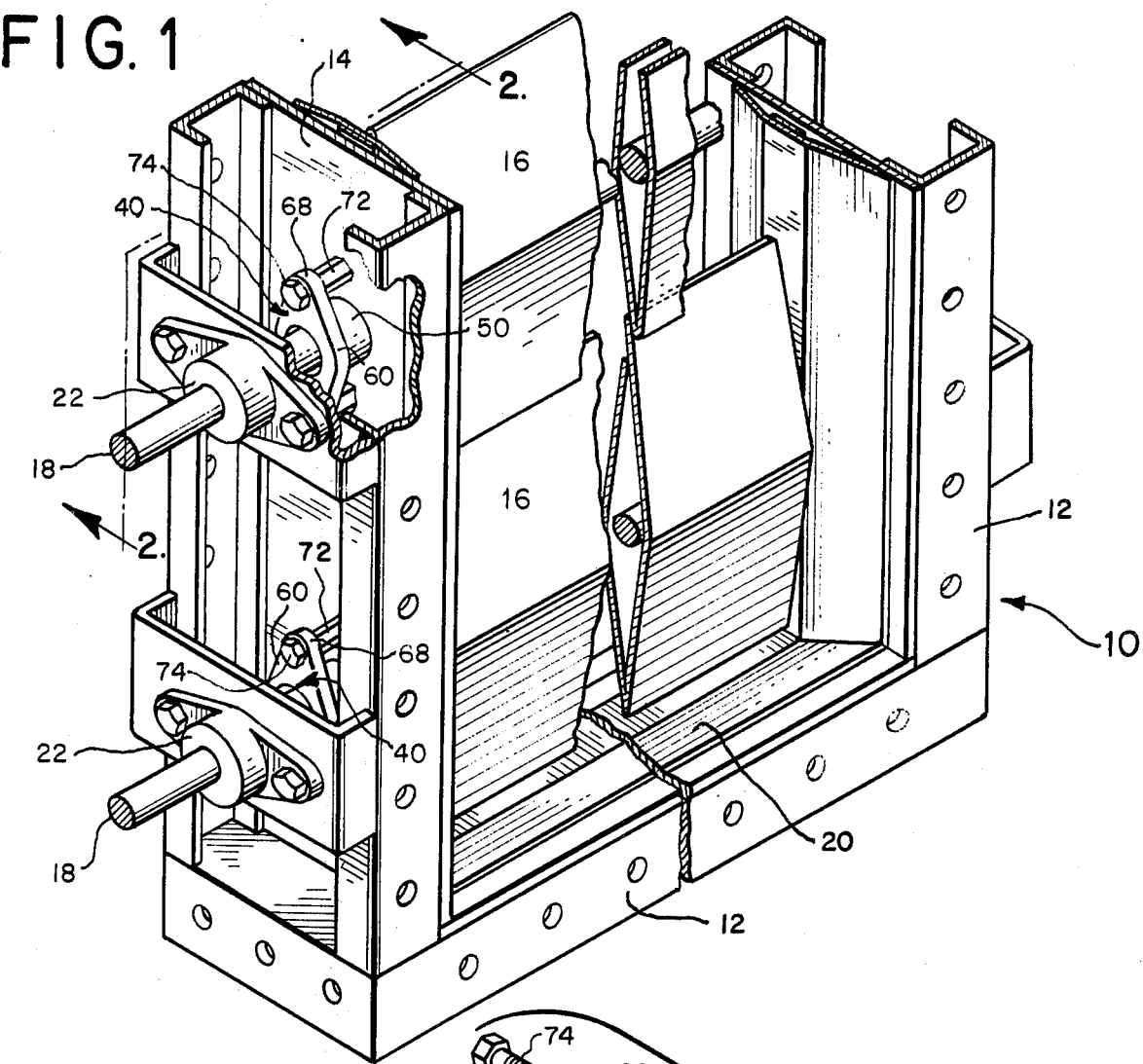
FIG. 1 is a perspective view of a portion of a movable blade damper which incorporates the presently preferred embodiment of the improved packing gland assembly of this invention.
Figure 2:
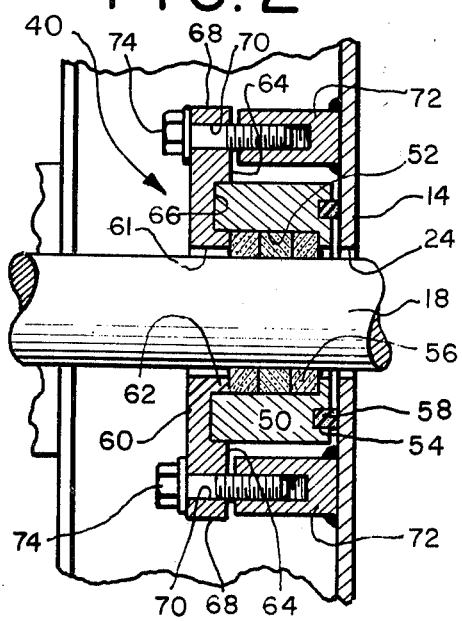
FIG. 2 is a sectional view taken along line 2—2 of FIG. 1.
Figure 3:
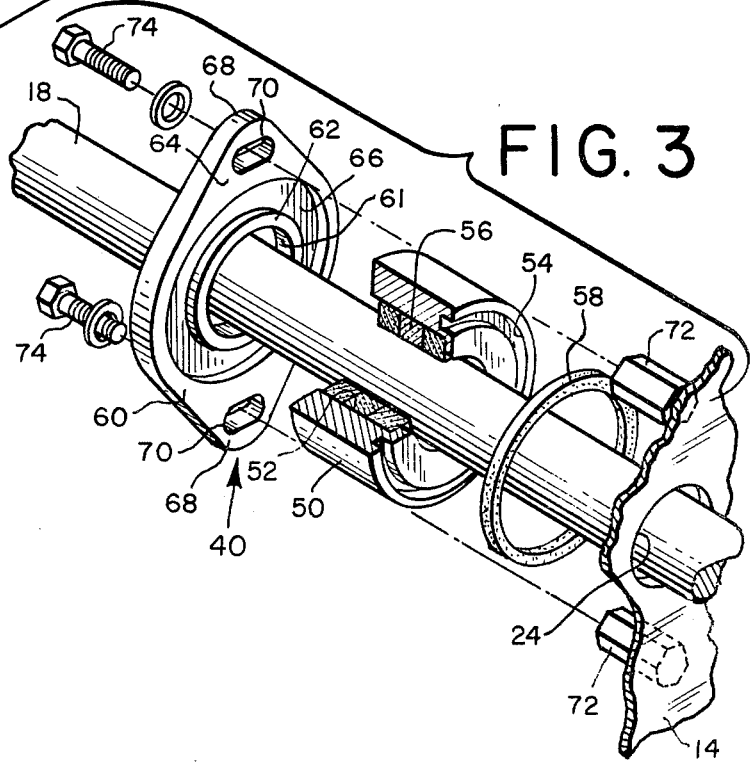
FIG. 3 is an exploded perspective view of the packing gland assembly of FIGS. 1 and 2.

Turning now to the drawings, FIG. 1 shows a perspective view of a movable blade damper 10. As shown in FIG. 1, this damper 10 comprises a peripheral frame 12 which is rectangular in shape and defines the outer edge of the damper 10. This peripheral frame 12 includes a frame member 14 which defines a number of spaced shaft openings 24, as shown in FIGS. 2 and 3. The damper 10 includes a number of movable blades 16, each of which is mounted on a respective blade shaft 18. The blade shafts 18 are positioned in a parallel relationship such that each is oriented parallel to an axial sealing surface 20 mounted on the frame 12, and each of the blade shafts 18 extends perpendicularly to the frame member 14. A respective bearing 22 is mounted to the frame member 14 in alignment with each of the blade shafts 18. Though not shown in the view of FIG. 1, comparable bearings are provided at the opposite end of each of the blade shafts 18. In use, means are provided (not shown) for rotating the blade shafts 18 in coordination such that the blades 16 can be rotated from the closed position shown in FIG. 1 by 90° to an open position. In this manner, the damper 10 can be opened or closed either to allow or to prevent the passage of gases through the damper. One important application of dampers such as damper 10 is as a flue gas damper.

Turning now to FIGS. 2 and 3, the presently preferred embodiment of the packing gland of this invention comprises a packing gland assembly 40. This assembly 40 includes a packing gland sleeve 50 positioned around the blade shaft 18. The sleeve 50 defines an annular recess 52 between the sleeve 50 and the shaft 18. This recess 52 serves to define a cavity which receives a packing material 56. Thus, the packing material 56 is positioned and confined between the shaft 18 and the sleeve 50. In addition, the sleeve 50 defines a circular seal recess 54 on the face of the sleeve 50 adjacent the frame member 14. This recess 54 serves as a mounting recess to confine and position a high temperature pressure seal 58 in place adjacent the frame member 14.

The packing gland assembly 40 also includes a packing gland cap 60. This cap 60 defines a central opening 61 sized to receive the blade shaft 18. In addition, the cap 60 defines an inner circular ridge 62, immediately adjacent the central opening 61, and an outer ridge 64. In effect, the inner and outer ridges 62,64 define a circular groove 66 therebetween. The packing gland cap 60 also defines two diametrically opposed hold-down members 68, each of which defines a respective hold-down opening 70. As best seen in FIG. 3, each of the hold-down openings 70 is elongated such that its maximum dimension is about twice that of its minimum dimension.

As best seen in FIGS. 2 and 3, two spaced attachment members 72 are rigidly mounted in place on the frame member 14. In this preferred embodiment, each of the attachment members 72 comprises a respective coupling nut, and both of the attached members 72 are welded in place to the frame member 14. The packing gland assembly 40 is held in place on the frame member 14 by means of two threaded fasteners 74. As best seen in FIG. 3, each threaded fastener 74 comprises a threaded bolt which passes through a respective one of the hold-down openings 70 and is then threadedly secured to the respective attachment member 72.

The fasteners 74 of this embodiment simultaneously serve two functions. First, they clamp the packing gland cap 60 in place over the packing gland sleeve 50 with the sleeve 50 captured in the groove 66 between the inner ridge 62 and the outer ridge 64. When clamped, the inner ridge 62 extends down into the annular recess 52 to compress the packing material 56 in order to achieve the desired seal between the packing gland sleeve 50 and the blade shaft 18. Here, it is important to note that it is the height of the inner ridge 62 which defines the maximum compression possible for the packing material 56. Thus, by merely tightening the fastener 74 completely, the packing gland cap 60 is caused to compress the packing material 56 to the desired extent.

Second, the fasteners 74 serve to clamp the packing gland sleeve 50 in place against the frame member 14 and to position it laterally. Thus, the fasteners 74 clamp the pressure seal 58 between the frame member 14 and the packing gland sleeve 50 in order to achieve the desired seal therebetween.

In use, the packing gland assembly is assembled as shown in FIGS. 2 and 3 and the fasteners 74 are retained in a loose fit. The blade shaft 18 is then adjusted as necessary to bring the blades 16 into proper sealing relationship. Generally, some degree of lateral movement of the shafts 18 will be required to position the blades 16 properly in order to obtain a good close fit between the blades 16 when the damper is closed. Once the blade shafts 18 have been properly positioned, the fasteners 74 are then securely tightened in the attachment members 72 in order to lock the packing gland assembly 40 in place about the blade shaft 18. In this way, excellent concentricity and therefore excellent sealing between the packing gland sleeve 50 and the blade shaft 18 is obtained. Of couse, the fasteners 74 can be loosened whenever necessary to reposition any of the blade shafts 18. Furthermore, the fasteners 74 can be loosened and removed if it ever becomes necessary to replace the pressure seal 58, the packing material 56, or any other component of the packing gland assembly 40.

In this preferred embodiment the packing gland sleeve 50 and the packing gland cap 60 are formed of carbon steel which has been painted to reduce corrosion. In high temperature applications it may be preferable to form these components from stainless steel. The fasteners 74 are preferably plated, and the packing material 56 and the pressure seal 58 can be formed of any suitable packing material. For example, in the presently preferred embodiment the packing material and the pressure seal are formed of a graphite impregnated asbestos braided yarn, such as that marketed by Raybestos-Manhattan of Charleston, S.C. as type RM-303 for applications in which the temperature does not exceed 800° F. and type RM-325 for applications in which the temperature does not exceed 1200° F.

In the preferred embodiment described above, the shaft opening 24 is provided with a radius one-quarter inch greater than that of the blade shaft 18. Similarly, the hold-down openings 70 are larger than the fasteners 74 so as to allow lateral adjustment in range of plus or minus one-quarter inch. As shown in the drawings, the pressure seal 58 should be sufficiently larger than the shaft opening 24 such that an effective seal is maintained between the pressure seal 58 and the frame member 14, even at the extremes of lateral adjustment of the packing gland assembly 40.

Of course, it should be understood that various changes and modifications can be made to the preferred embodiment described above. For example, in alternate embodiments the attachment members 72 can comprise threaded studs which fit within the hold-down openings, in which case each of the fasteners 74 would comprise a threaded nut. Alternatively, the hold-down members 68 can be positioned on the packing gland sleeve 50, in which case alternate means such as another set of fasteners should be used to retain the packing gland cap 60 in place on the packing gland sleeve 50. Furthermore, in some applications it may be preferable to invert the packing gland sleeve 50 such that it is the frame member itself which acts as a cap to confine the packing material 56.

It is therefore intended that the foregoing detailed description be regarded as merely illustrative of the presently preferred embodiment. It is intended that the following claims, including all equivalents, define the scope of this invention.

I claim:

1. In combination with a damper comprising a peripheral frame member, at least one opening defined in the frame member, a damper blade shaft passing through the opening, and a damper blade mounted to the shaft to one side of the frame member, the improvement comprising:

a packing gland assembly comprising:
a packing gland sleeve disposed around the shaft, said packing gland sleeve defining an annular recess positioned adjacent the shaft;
a packing material positioned in the recess between the shaft and the packing gland sleeve; and
means for retaining the packing material in place in the annular recess to create an effective seal between the shaft and the sleeve;

a pressure seal disposed between the packing gland assembly and the frame member around the opening to prevent leakage of gases between the damper frame member and the packing gland assembly;

at least one attachment member fixedly mounted to the frame member adjacent the opening;

at least one hold-down member, included in the packing gland assembly and aligned with the at least one attachment member; and at least one fastener clamping the hold-down member against the attachment member to releasably and adjustably hold the packing gland assembly in place against the frame;

said attachment member, hold-down member and fastener cooperating to provide a range of lateral adjustability of the position of the packing gland assembly with respect to the frame before the fastener is secured in place, to enhance the concentricity of the packing gland sleeve around the shaft;

said attachment member, hold-down member, and fastener cooperating to rigidly and fixedly secure the packing gland assembly in place on the frame member when the fastener is secured in place;

said pressure seal operating to create an effective seal between the frame member and the packing gland throughout the range of lateral adjustability.

2. The invention of claim 1 wherein the retaining means comprises a packing gland cap which defines a central opening through which the shaft passes, and further, wherein the hold-down member is defined by the packing gland cap.

3. The invention of claim 1 or 2 wherein the attachment member defines a first threaded opening, the hold-down member defines a second opening, and the fastener comprises a threaded bolt which passes through the second opening and is threadedly engaged with the first threaded opening, wherein the second opening is larger than the bolt to provide the range of lateral adjustability.

4. The invention of claim 1 or 2 wherein the range of lateral adjustability is at least one-quarter inch.

5. The invention of claim 1 wherein the packing gland sleeve defines a seal recess adjacent the frame member and the pressure seal is positioned in the seal recess.

6. The invention of claim 2 wherein the packing gland cap defines an annular ridge around the central opening positioned to compress the packing material, wherein the size of the ridge defines the maximum possible compression of the packing material.

7. In combination with a movable blade damper comprising a peripheral frame, at least one shaft opening defined in the frame, a damper blade shaft passing through the shaft opening, and a damper blade mounted to the shaft within the frame and positioned to seal along its length to a sealing surface, the improvement comprising:

a packing gland sleeve positioned around the shaft adjacent the frame, said sleeve sized larger than the shaft such that the sleeve does not contact the shaft, said sleeve defining an annular recess between the shaft and the sleeve;

a packing material disposed around the shaft in the recess between the shaft and the sleeve;

a packing gland cap positioned to confine the packing material in the recess, said cap defining a central opening through which the shaft passes and at least two symmetrically spaced hold-down points, each hold-down point defining a respective hold-down opening, said central opening sized larger than the shaft such that the shaft does not contact the cap;

a pressure seal disposed between the packing gland sleeve and the frame around the shaft opening;

at least two attachment members fixedly mounted to the frame, each aligned with a respective one of the hold-down openings; and at least two threaded fasteners, each extending between a respective one of the attachment members and the corresponding hold-down point and passing through the respective hold-down opening to adjustably and releasably clamp the packing gland sleeve and cap to the frame;

said hold-down openings each having a maximum dimension at least one-quarter inch greater than the respective fastener to permit the packing gland sleeve and cap to be positioned through a lateral adjustment range of at least one-quarter inch to preserve concentricity between the shaft and the packing gland sleeve as the blade shaft is positioned laterally to bring the blade into sealing alignment with the sealing surface;

said attachment members, fasteners, and hold-down points cooperating the rigidly and fixedly clamp the packing gland cap and seal in place on the frame when the fasteners are secured to the attachment members in order to prevent relative movement therebetween;

said pressure seal positioned outside the shaft opening by a sufficient distance such that the pressure seal provides an effective seal between the sleeve and the frame throughout the range of lateral adjustment.

8. The invention of claim 7 wherein the sleeve defines a pressure seal recess adjacent the frame and the pressure seal is positioned in the pressure seal recess.

9. The invention of claim 7 wherein each of the attachment points comprises a respective coupling nut and each of the fasteners comprises a respective bolt.

10. The invention of claim 7 wherein the cap defines an inner annular ridge around the central opening and positioned to extend within the annular recess, wherein the size of the inner annular ridge determines the maximum extent to which the packing material can be compressed by the cap.

11. The invention of claim 10 wherein the cap defines an outer annular ridge positioned to extend around the sleeve and to center the cap on the sleeve.

12. The invention of claim 7 wherein each of the attachment members is mounted to the frame by welding.

* * * * *

UNITED STATES PATENT AND TRADEMARK OFFICE
CERTIFICATE OF CORRECTION

PATENT NO. : 4,407,510
DATED : October 4, 1983
INVENTOR(S) : Jack M. Cornelius and Egon V. Braunagel It is certified that error appears in the above-identified patent and that said Letters Patent is hereby corrected as shown below:

IN THE CLAIMS

Column 6, Claim 7, line 43, please delete "cooperating the", and substitute therefor --cooperating to--.

Signed and Sealed this

Fifteenth Day of January 1985

[SEAL]

Attest:

GERALD J. MOSSINGHOFF

Attesting Officer     Commissioner of Patents and Trademarks